Nov. 7, 1950        G. W. KOWALSKY        2,528,961
SMOKING PIPE
Filed June 12, 1945
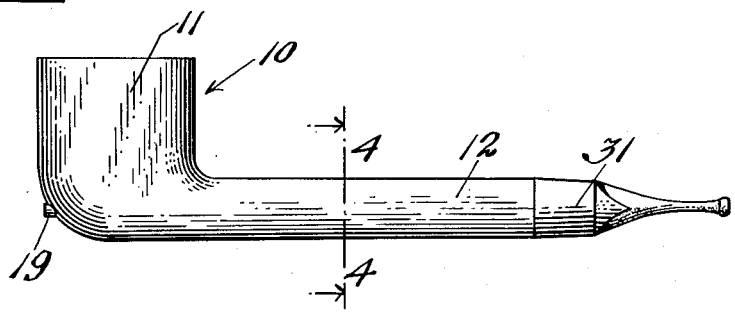
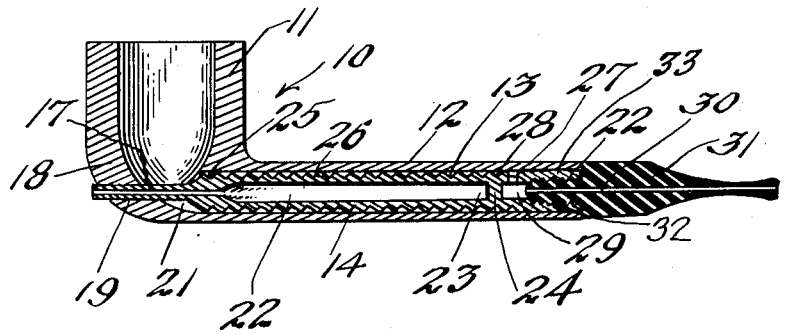
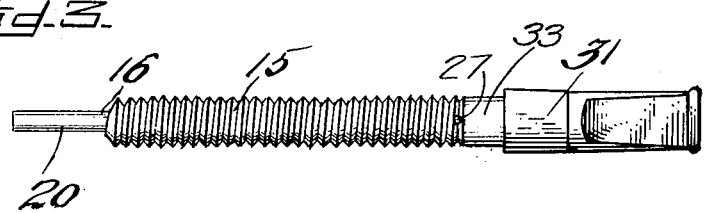
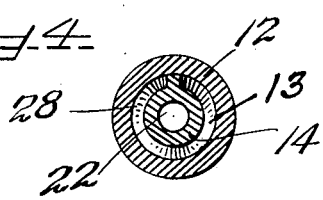
*Inventor*
GEORGE W. KOWALSKY
By *Clarence A. O'Brien and Harvey B. Jacobson*
*Attorneys*

Patented Nov. 7, 1950

2,528,961

UNITED STATES PATENT OFFICE 2,528,961

SMOKING PIPE

George W. Kowalsky, Wisconsin Rapids, Wis., assignor of one-half to Albert J. Forst, Wisconsin Rapids, Wis.

Application June 12, 1945, Serial No. 598,947

1 Claim. (Cl. 131—195)

This invention relates to smoking pipes and has for its object to provide a self-cleaning pipe.

Another object of the invention is to provide a pipe having a spirally threaded tube extending entirely through the stem.

A further object of this invention is to provide in a pipe a ventilating or cooling tube extending through the stem and bowl of the pipe.

A still further object of my invention is to provide in a pipe a ventilating tube for the stem of the pipe which also acts as a support or grate for the tobacco used in the pipe.

Other features and advantages will become more readily apparent from the following description and the accompanying illustrative drawings in which:

Figure 1 is an elevational view of my improved pipe,

Figure 2 is a longitudinal sectional view thereof,

Figure 3 is a detail elevation of a pipe core, and

Figure 4 is a sectional view taken on line 4—4 of Figure 1.

In the accompanying drawings as above enumerated and in the following specification, like characters of reference indicate like parts throughout of which 10 is a tobacco pipe formed in accordance with my invention, which consists of a bowl 11, having an integral stem 12. The relatively large bore 13 is of a sufficient diameter to receive the tubular member 14, which is externally screw-threaded as at 15, throughout the length of the stem and beyond its screw-threaded portion as at 16, the member 14, is considerably reduced in diameter and is provided with a bore 17, aligning with the bore of the member 14. The bowl of the pipe is provided in its outer wall 18 with a bore 19. The reduced forward end portion 20 of the stem is formed with a smooth inner and outer wall and extends through the lower portion 21 of the bowl and through said bore 19, thus permitting a passage of air through the bore 17 and into the bore 22, of said member 14. This latter bore is stopped near its outer end 23, by a wall 24. A passage 25, is provided from the bowl of the pipe into the spiral formed between the threads 15, and the inner wall 26, of the stem 12. A port 27 is formed between the spiral channel 28 and the recess 29 into which the bore 30 of the mouthpiece 31 also enters. The said mouthpiece 31 is provided with a reduced threaded extension 32 which is threaded into end 33 of the stem. From the foregoing it will be seen that I have provided a pipe with a relatively short stem through which smoke must travel a very considerable distance from the bowl of the pipe through the spiral passage to the mouthpiece thereof greatly to reduce the heat of the smoke, which heat will be further reduced due to the fact of the free passage of air into the bore 22, of member 14. Furthermore, the member 19, extending through the lower portion of the pipe bowl forms a kind of grate to support the tobacco contained in the pipe and to prevent it from packing therein.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

A pipe having a bowl and an integral shank formed with a relatively large bore extending throughout its entire length, said bowl being formed with a relatively reduced bore extending through its front wall and spaced from and in axial alignment with the relatively large bore in said shank, an externally threaded hollow stem formed with a reduced, open, forward end portion and receivable respectively in said relatively large bore in said shank and in the reduced bore in said bowl, a partition wall in the rear end of said hollow stem dividing said stem into a cooling chamber at the front of said hollow stem and a smoke chamber at the rear end thereof, said hollow stem being formed with a radial port connecting the exterior of said stem with said smoke chamber, and a mouthpiece formed with a central bore extending throughout its length and disposed at the rear end of said stem and communicating with said smoke chamber and said reduced forward end portion of said stem being formed with a smooth and imperforate inner and outer wall and adapted for horizontal positioning in the bowl and spaced above the bottom of said bowl to support burning tobacco therein while cooling the same.

GEORGE W. KOWALSKY.

REFERENCES CITED

The following references are of record in the file of this patent:

UNITED STATES PATENTS

| Number | Name | Date |
|---|---|---|
| 815,318 | Ongley | Mar. 13, 1906 |
| 1,656,112 | Grenier | Jan. 10, 1928 |
| 1,897,535 | Singletary | Feb. 14, 1933 |
| 1,924,539 | Brown | Aug. 29, 1933 |
| 1,955,474 | Schumacher | Apr. 17, 1934 |
| 2,206,165 | Daymude | July 2, 1940 |
| 2,252,880 | Carlberg | Aug. 19, 1941 |
| 2,324,704 | Houts | July 20, 1943 |

FOREIGN PATENTS

| Number | Country | Date |
|---|---|---|
| 25,431 | Great Britain | 1911 |
| 29,983 | Switzerland | Jan. 29, 1904 |
| 573,518 | France | Mar. 12, 1924 |